US010192089B1

(12) United States Patent
Rapoport et al.

(10) Patent No.: US 10,192,089 B1
(45) Date of Patent: Jan. 29, 2019

(54) SYSTEMS AND METHODS FOR AUTHENTICATION OF CONSUMER PRODUCTS

(71) Applicant: HONEYWELL INTERNATIONAL INC., Morris Plains, NJ (US)

(72) Inventors: William Ross Rapoport, Bridgewater, NJ (US); Eric Diken, Cedar Knolls, NJ (US); Garth Zambory, Burke, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/008,962

(22) Filed: Jun. 14, 2018

Related U.S. Application Data

(60) Provisional application No. 62/536,864, filed on Jul. 25, 2017.

(51) Int. Cl.
*G06K 7/10* (2006.01)
*G06K 7/12* (2006.01)

(52) U.S. Cl.
CPC .............. *G06K 7/12* (2013.01); *G06K 7/1098* (2013.01); *G06K 7/10722* (2013.01)

(58) Field of Classification Search
CPC ..... G06K 7/12; G06K 7/10722; G06K 7/1098
See application file for complete search history.

(56) References Cited

U.S. PATENT DOCUMENTS 7,571,856 B2    8/2009  Lo
8,534,544 B1 *  9/2013  Eker .................. G06K 9/00577
                                                235/375
(Continued)

FOREIGN PATENT DOCUMENTS

CN      1457206 A      11/2003
CN    101872575 A      10/2010
(Continued)

OTHER PUBLICATIONS

Brauers, Johannes and Til Aach, "A Color Filter Array Based Multispectral Camera," Institute of Imaging & computer Vision, May 7, 2008.
(Continued)

*Primary Examiner* — Seung H Lee
(74) *Attorney, Agent, or Firm* — Lorenz & Kopf, LLP

(57) ABSTRACT

Systems and methods for authentication of a consumer product are provided herein. An embodiment of a method for authentication of a consumer product includes providing the consumer product, optionally with packaging material associated therewith. Filtered light from an intrinsic portion of the consumer product or packaging material associated therewith is detected using a photodetector of a portable computing device to produce at least one single-color image data set representative of the intrinsic portion for at least one color. The at least one single-color image data set is compared with a stored data set that is representative of authentic information for the intrinsic portion using a microprocessor of the portable computing device, with the comparison conducted independent of and separate from any analysis of non-color data obtained from preconfigured security features. An indication of authenticity of the consumer product is provided based upon the comparison.

19 Claims, 3 Drawing Sheets

(56) References Cited

U.S. PATENT DOCUMENTS

| | | | |
|---|---|---|---|
| 8,943,320 B2 | 1/2015 | Sabin et al. | |
| 9,053,364 B2 | 6/2015 | Mercolino et al. | |
| 9,183,688 B2 | 11/2015 | Gardner et al. | |
| 9,282,265 B2 | 3/2016 | Leung et al. | |
| 2009/0102179 A1 | 4/2009 | Lo | |
| 2012/0298743 A1* | 11/2012 | Voloshynovskyy | G07D 7/005 235/375 |
| 2014/0254664 A1 | 9/2014 | Liu et al. | |
| 2015/0310454 A1 | 10/2015 | Ranieri et al. | |
| 2016/0019421 A1 | 1/2016 | Feng et al. | |
| 2016/0072980 A1 | 3/2016 | Goktekin | |

FOREIGN PATENT DOCUMENTS

| | | |
|---|---|---|
| KR | 101216430 B1 | 1/2013 |
| WO | 2010/050928 A1 | 5/2010 |

OTHER PUBLICATIONS

Rehman, Saif UR, et al., "Reliable Identification of Counterfeit Medicine Using Camera Equipped Mobile Phones," IEEE, May 2011.

"Turning Your Smartphone Into an Authentication Device," International Pharmaceutical Industry, Summer/Autumn 2013, vol. 5, Issue 3.

\* cited by examiner

SYSTEMS AND METHODS FOR AUTHENTICATION OF CONSUMER PRODUCTS

CROSS-REFERENCE TO RELATED APPLICATIONS

This application claims the benefit of U.S. Provisional Application No. 62/536,864, filed Jul. 25, 2017.

TECHNICAL FIELD

The technical field generally relates to systems and methods for authentication of consumer products, and more particularly relates to systems and methods for authentication of consumer products based upon intrinsic features of the products or packaging material associated therewith.

BACKGROUND

Counterfeiting of articles such as documents, merchandise, and currency is a growing problem worldwide, and authentication of such articles has become increasingly important as counterfeiting capabilities have increased in sophistication. Recent developments have focused upon providing pre-configured security features such as 2D and 3D barcodes, indicia including engineered materials having authenticable properties such as magnetic and/or luminescent properties, RFID chips, and the like. However, such pre-configured security features often require specialized authentication systems for interrogation thereof. Further, such pre-configured security features may affect price and appearance of the articles associated with the security features.

While the pre-configured security features are often useful for retailers, banks, or other establishments, consumers are also often desirous of determining authenticity of consumer products, especially when purchasing brand-name goods that are widely subject to counterfeiting. However, consumers generally do not have access to specialized devices that are specifically adapted to authenticate pre-configured security features.

Recent develops with optical character recognition (OCR) have given rise to a variety of new services and capabilities using portable computing devices, such as smartphones and tablet computers. For example, remote bank check deposits are made possible using OCR technology and a camera of the portable computing devices. To deposit bank checks, the geometry of the bank check is recognized within a field of view of the camera. Following recognition of the bank check geometry, OCR is conducted on specific areas of the bank check to gather relevant information from the bank check. The gathered information is then employed by an electronic banking program to complete the financial transaction. While remote bank check deposit technology is very useful for financial transactions, such technology has limitations that impede broader implementation. For example, bank checks have a relatively simple, standard shape and fields subject to OCR are generally consistent between documents. Further, the bank check deposit technology fundamentally requires characters associated with the bank checks that are available for interrogation by OCR technology. Thus, such technology is not applicable to authenticity determinations based upon anything other than characters.

Accordingly, it is desirable to provide systems and methods for authentication of consumer products that are readily available to consumers. In addition, it is desirable to provide systems and methods for authentication of consumer products that do not rely upon pre-configured security features and that do not require specialized devices that are required to enable authentication of such pre-configured security features. Furthermore, other desirable features and characteristics will become apparent from the subsequent detailed description and the appended claims, taken in conjunction with the accompanying drawings and this background.

BRIEF SUMMARY

Systems and methods for authentication of a consumer product are provided herein. An embodiment of a method for authentication of a consumer product includes providing the consumer product, optionally with packaging material associated therewith. Filtered light from an intrinsic portion of the consumer product or packaging material associated therewith is detected using a photodetector of a portable computing device to produce at least one single-color image data set representative of the intrinsic portion for at least one color. The at least one single-color image data set is compared with a stored data set that is representative of authentic information for the intrinsic portion using a microprocessor of the portable computing device. Comparing of the at least one single-color image data set with the stored data set is conducted independent of and separate from any analysis of non-color data obtained from preconfigured security features. An indication of authenticity of the consumer product is provided with the portable computing device based upon an outcome of comparing the at least one single-color image data set with the stored data set representative of authentic information for the intrinsic portion.

Another embodiment of a method of authentication of a consumer product includes providing the consumer product, optionally with packaging material associated therewith. Filtered light from an intrinsic portion of the consumer product or packaging material associated therewith is detected using a photodetector of a portable computing device to produce at least one single-color image data set that is representative of the intrinsic portion for at least one color. An independent indication of authenticity of the consumer product is registered in a database using the portable computing device. The database is populated with the at least one single-color image data set after registering the independent indication of authenticity.

In another embodiment, a system for authentication of a consumer product includes a portable computing device and a database. The portable computing device includes a microprocessor and a photodetector. The photodetector is configured to produce single-color image data sets representative of an intrinsic portion of the consumer product or packaging material associated therewith. The database is in electronic communication with the microprocessor. The database is populated with single-color image data sets representative of authentic information for the intrinsic portion.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
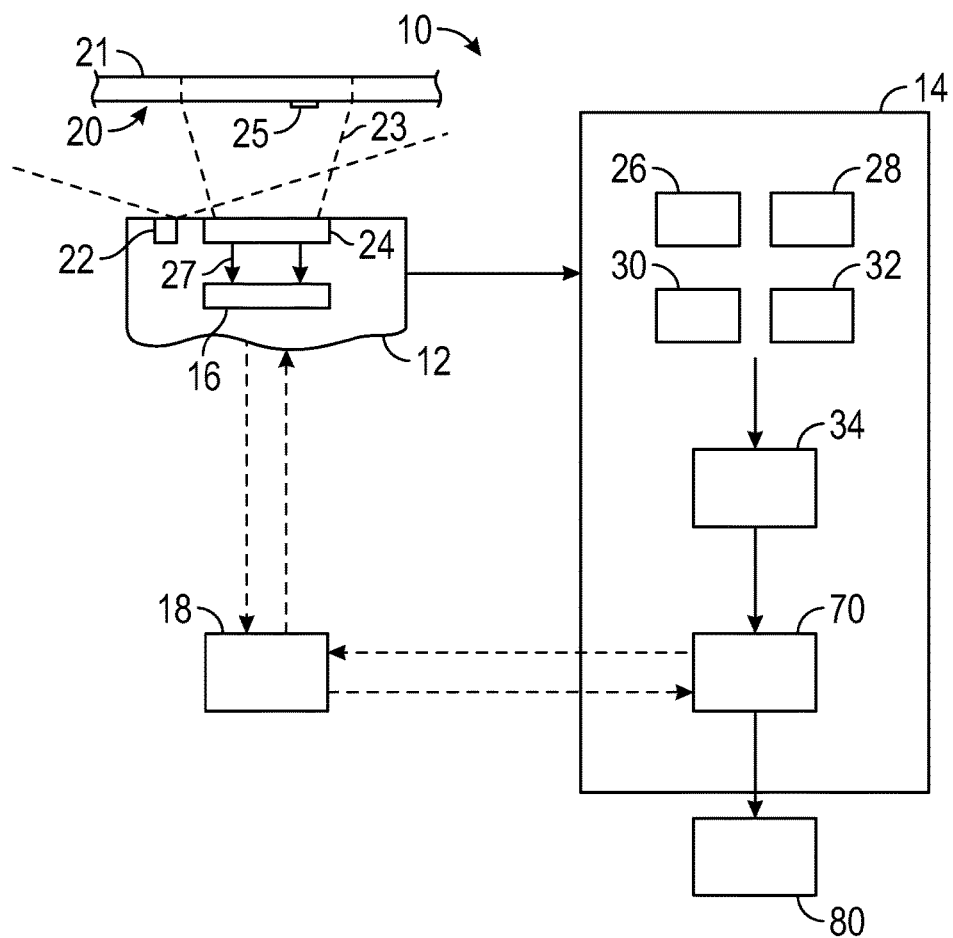
FIG. 1 is a schematic diagram of a system and method for authenticating a consumer product in accordance with an embodiment.

The following detailed description is merely exemplary in nature and is not intended to limit the systems and methods for authenticating consumer products as described herein. Furthermore, there is no intention to be bound by any theory presented in the preceding background or the following detailed description.

Embodiments described in detail below include systems and methods for authenticating consumer products. Consumer products, as referred to herein, are articles of manufacture, natural products, or other articles of commerce that a consumer is desirous of procuring for the product itself. The consumer can be a retail consumer, an industrial consumer, or any other individual or group of individuals that is desirous of learning authenticity of the product at issue. The systems and methods, as described herein, are readily available to consumers, relying upon portable computing devices such as cellphones, personal digital assistants (PDAs) or tablet computers, scanning devices, and the like to effectuate authentication by capturing an image of an intrinsic portion of the consumer product and comparing the image to a stored data set that is representative of authentic information for the intrinsic portion of the consumer product. In particular, filtered light from an intrinsic portion of the consumer product or packaging material associated with the consumer product is detected using a photodetector of the portable computing device to produce at least one single-color image data set representative of the intrinsic portion for at least one color, and the at least one single-color image data set is compared with the stored data set, with an indication of authenticity provided based upon the comparison. The "intrinsic portion" of the consumer product or, alternatively, an "intrinsic portion" of the packaging material associated with the consumer product, as referred to herein, is a portion of the product itself including design elements, material surfaces, artistic patterns, or the like that contribute to design and/or function of product rather than an added feature whose sole purpose is for providing an interrogable indication for authentication. The systems and methods, as described herein, do not rely upon pre-configured security features, with the comparison between the at least one single-color image data set and the stored data set conducted independent of and separate from any analysis of non-color data obtained from preconfigured security features. In this manner, authentication can be conducted by virtue of color analysis of the product or associated packaging itself utilizing the portable computing device without a requirement for specialized devices to enable authentication of complex pre-configured security features.

The systems and methods as described herein generally involve detecting and analyzing filtered light from an intrinsic portion of the consumer product or packaging material that is associated with the consumer products. The "intrinsic portion" of the consumer product or, alternatively, an "intrinsic portion" of the packaging material associated with the consumer product, is a portion of the product itself or packaging including design elements, material surfaces, artistic patterns, or the like that contribute to design and/or function of product rather than an added feature whose sole purpose is for providing an interrogable indication for authentication. The intrinsic portion represents the portion of the product or packaging that is interrogated for authentication purposes and is defined by at least a portion of a viewing area of the photodetector, as described in further detail below. In embodiments, the intrinsic portion is not preconfigured to provide an interrogable indication for authentication, and the intrinsic portion may be free from a preconfigured security feature. Rather, identification of the intrinsic portion as providing an interrogable area for authentication may be conducted in a later step associated with populating a database with authentic information, e.g., based upon observation of the consumer product after design of the consumer product is complete. For example, the consumer product may be analyzed for areas that would be difficult to fraudulently reproduce by a counterfeiter, and those areas may be designated as the intrinsic portion that is subject to interrogation for purposes of rendering authentication determinations.

Referring to FIG. 1, an embodiment of a system 10 and method for authentication of consumer products will be described in detail. In accordance with an embodiment of a system 10, the system 10 includes a portable computing device 12 and a database 18. It is to be appreciated that the portable computing device 12 and the database 18 may be contained in a single apparatus, or may be contained in separate apparatuses that are in electronic communication with each other. Further, it is to be appreciated that various features and structures as shown in FIG. 1 may be included in the same housing or may be physically separate, i.e., may be contained in different apparatuses that are in electronic communication with each other. In embodiments, the portable computing device 12 includes a microprocessor 14 and a photodetector 16. The portable computing device 12 may also include a light source 22, such as a conventional white LED that is derived from a blue LED and Ce:YAG phosphor. The portable computing device 12 can be any conventional PDA such as, but not limited to, a smartphone, a tablet computer, a laptop computer, smartwatch, or any other electronic device that includes the photodetector 16 and the microprocessor 14 and that is typically carried on or with a person during normal usage. The microprocessor 14 is configured by software to synchronize and control the photodetector 16 and the light source 22. The microprocessor 14, photodetector 16, and light source 22 are communicatively coupled so as to exchange signals and information. Hardware of the portable computing device 12 is typically not specialized to be used in accordance with the systems and methods as described herein, although it is to be appreciated that in embodiments the portable computing device 12 may be modified to enhance functionality in accordance with the systems and methods as described herein.

The photodetector 16 is configured to produce single-color image data sets 34 representative of the intrinsic portion 20 of the consumer product 21 or packaging material associated therewith. Production of the single-color image data sets is represented by box 34. For example, the single-color image data sets 34 may be conventionally produced through Bayer filtering, whereby light into the photodetector 16 passes through an array of spectral filters 24, resulting in patterns 26, 28, 30 of individual colors on a square grid of photosensors in the photodetector 16. Conventionally, a mosaic of the patterns 26, 28, 30 forms an RGB image, and pixel data from the photodetector 16 and representative of the RGB image can be stored in the portable computing device 12 or associated storage media. A black/white pattern 32 may also be derived from the respective color patterns 26, 28, 30. However, each pattern 26, 28, 30 can be captured to produce a single-color image data set 34 representative of the respective red, green, and blue color patterns. In embodiments, the single-color image data sets 34 can include pixel location and intensity data for each pixel in the pattern, effectively quantifying the information gathered by each pixel.

When exposed to light emitted by the light source 22 (e.g., light from the LED), the intrinsic portion 20 emits at least some spectral content in the visible wavelength. More specifically, the intrinsic portion 20 has areas of visible "color" that can be resolved by the photodetector 16 of the PDA. In embodiments, the intrinsic portion 20 has a minimum amount of spectral content to enable effective yield of patterns 26, 28, 30 in at least a portion of the viewing area 23 of the photodetector 16. Conversely, the intrinsic portion 20 may have a maximum content of non-spectral content such as, e.g., black lettering or metallic features that would make color comparison difficult. The minimum amount of spectral content may vary depending upon number of pixels of the digital camera, clean area (devoid of other characters or color changes) around the intrinsic portion 20, focus requirements for the digital camera, fast movement that could blur the image, or other factors known to impact image quality. In one embodiment, for a photodetector having a high number of pixels (e.g., >5 MP), then the minimum amount of spectral content may be at least 5% while still enabling effective yield of patterns 26, 28, 30.

The database 18 is in electronic communication with the microprocessor 14, and the database 18 is populated with single-color image data sets 34 that are representative of authentic information for the intrinsic portion 20 of particular consumer products. Methodologies for populating the database 18 are described in further detail below. The database 18 can be maintained in a non-transitive storage medium that is either physically included in the portable computing device 12, or physically separate but in electronic communication with the portable computing device 12.

An exemplary embodiment of a method for authentication of a consumer product 21 will now be described with reference to FIGS. 1 and 2. The database 18 is populated with authentic information for the intrinsic portion 20 to produce the stored data set. In an embodiment, the database 18 can be pre-populated with authentic information for one or more consumer products directly from a manufacturer, retailer, or other party that is in possession of the consumer product 21 prior to transfer to a consumer, i.e., the database 18 may or may not be configured for updating with authentic information provided by consumers. In this embodiment, the database 18 may include imaging template data for appropriate intrinsic portions 20 of various consumer products 21, stored single-color image data sets representative of authentic information for comparison with single-color image data sets 34 gathered by consumers for corresponding intrinsic portions 20, and other data that is available for identification of authentication of specific consumer products 21. Imaging template data may include geometries and framing image overlays to assist the consumer with identifying and capturing an image of the intrinsic portion 20 of a consumer product 21 using the portable computing device 12, as described in further detail below.

In accordance with the exemplary method, the consumer product 21 is provided, optionally with packaging material associated therewith. The consumer product 21 may be provided at various locations including, but not limited to, a retail location, a wholesale location or warehouse, or in public commerce (e.g., during an exchange between consumers). A software application or "app" may be initiated in the portable computing device 12, and information regarding the imaging template data for the intrinsic portion 20 may be retrieved from the database 18 based upon preliminary information 40 for the consumer product 21, represented by box 40 in FIG. 2. For example, in embodiments, the imaging template data may be retrieved based upon preliminary information 40 such as an image of the consumer product 21 or information associated therewith such as a barcode, QR code, or other information obtained using the photodetector 16. In other embodiments, the consumer may manually enter the preliminary information 40 such as product descriptions, brand names, and the like into a search query. In both embodiments, various preliminary matches can be returned from the database 18 and available for manual selection by the consumer on a screen (not shown) of the portable computing device 12. Additionally, the preliminary information 40 may also qualify as an independent indication of authenticity of the consumer product 21 in the database 18, depending upon the origin of the information, and such information may be employed during authentication as described in further detail below. For example, if the preliminary information 40 includes information from a sales receipt from an authorized retailer, such preliminary information 40 may be useful to assist with authentication determination.

The method may proceed with identifying the intrinsic portion 20 of the consumer product 21 within the viewing area 23 of the photodetector 16 using the microprocessor 14 of the portable computing device 12. In an embodiment, upon successful identification of the consumer product 21 to be authenticated within the software application, an imaging template may be generated on the screen of the portable computing device 12, with the imaging template based on the imaging template data obtained from the database 18. The imaging template overlies a viewing area 23 of the photodetector 16 as displayed on the screen of the portable computing device 12 so as to provide an indication to the consumer of the general geometry of features for which to search for the intrinsic portion 20 on the consumer product 21 or packaging thereof. The portable computing device 12 may provide feedback to the consumer to move closer or in particular directions for purposes of isolating and/or optimizing the intrinsic portion 20 of the consumer product 21 in the viewing area 23 of the photodetector 16 based upon the imaging template. For example, the portable computing device 12 may provide feedback for the consumer to move orientations to minimize specular reflection or other image contamination factors. As represented by box 50 in FIG. 2, a match is determined between the imaging template and corresponding geometry of the intrinsic portion 20 in the viewing area 23 of the photodetector 16 (represented by "Yes" from Box 50 in FIG. 2), or feedback is provided to the consumer that a match has not been made (represented by "No" from Box 50 in FIG. 2). In another embodiment and referring to FIG. 1, the consumer product 21 may be provided with the intrinsic portion 20 including a demarcating element 25 for identifying the intrinsic portion 20 to be considered for comparison to the authentic information. In embodiments, the demarcating element 25 may be a solid line, e.g., a black line bordering colored areas of the consumer product 21 or packaging material associated therewith. In other embodiments, the demarcating element 25 may be a specific pigment included in areas of the consumer product 21 or packaging material associated therewith that identifies the intrinsic portion 20 to be analyzed. However, the demarcating element 25 as described herein is limited to identification of intrinsic areas to be interrogated, but does not otherwise factor into authentication determinations. In embodiments, the demarcating element 25 is identified during creation of the authentic information and is not designed for authentication purposes during design and production of the consumer product 21 itself. In this embodiment, the demarcating element 25 may be provided by the database/application itself with the demarcating element 25 identified from previously-collected images of the consumer product 21 or packaging associated therewith. The portable computing device 12 may provide feedback to the consumer to move closer or in particular directions for purposes of isolating the intrinsic portion 20 of the consumer product 21 in the viewing area 23 of the photodetector 16 based upon locating of the demarcating element 25 in the viewing area 23 of the photodetector 16. In yet other embodiments, the consumer may manually select or "lasso" a portion of the consumer product 21 as represented in the viewing area 23, e.g., by drawing a border on the screen of the portable computing device 12, with the selected portion identified as the intrinsic portion 20 to be considered for comparison to the authentic information.

Figure 2:
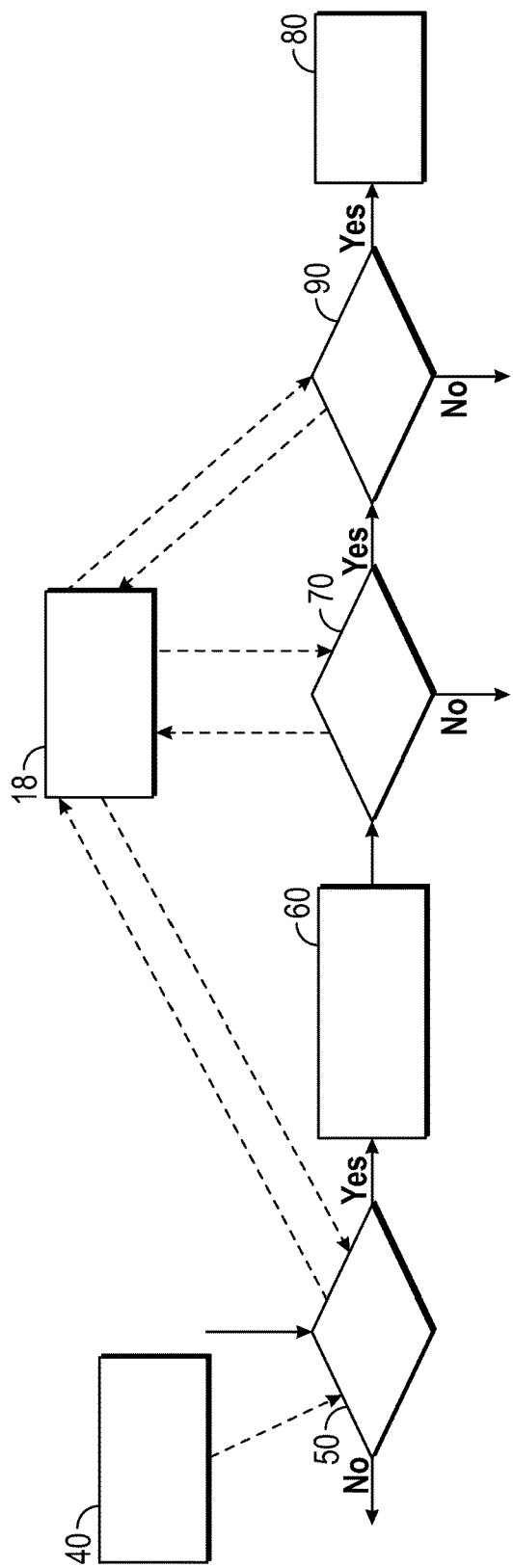
FIG. 2 is a schematic flow diagram of a method for authenticating a consumer product using the system as illustrated in FIG. 1 in accordance with an embodiment.

After identification of the intrinsic portion 20 using the portable computing device 12, and as represented by box 60 in FIG. 2, the method proceeds with detecting filtered light 27 from the intrinsic portion 20 of the consumer product 21 or packaging material associated therewith using the photodetector 16 of the portable computing device 12 to produce at least one single-color image data set 34 that is representative of the intrinsic portion 20 for at least one color. In embodiments, filtered light 27 is detected to produce a plurality of single-color image data sets 34 that are representative of the intrinsic portion 20 for a plurality of respective colors (e.g., red, green, and blue). In embodiments and as shown in FIG. 1, the detected light is filtered light 27 that is passed through one or more spectral filters 24. Further, in embodiments, the least one single-color image data set 34 is produced after determining the match between the imaging template and the corresponding geometry of the intrinsic portion 20 of the consumer product 21.

Once the at least one single-color image data set 34 is produced in box 34, the at least one single-color image data set 34 is compared with a stored data set for the corresponding color that is representative of authentic information for the intrinsic portion 20, as represented in box 70 of FIGS. 1 and 2. In embodiments, the plurality of single-color image data sets 34 are compared with stored data sets for the respective single colors. Comparison of the at least one single-color image data set 34 with the stored data set may be conducted independent of and separate from any analysis of non-color data obtained from preconfigured security features, e.g., magnetic, temporal, RFID, or other non-color properties of security features that are often employed to conduct authentication analysis. The comparison can be conducted using the microprocessor 14 of the portable computing device 12, with the microprocessor 14 accessing the database 18 in the non-transitive storage medium to obtain the stored data set. The stored data set corresponds to the single-color image data set 34 for the intrinsic portion 20, and a correlation function may be applied between the respective data sets for purposes of assessing differences between the data sets. For example, in embodiments, an integral of intensity values for can be taken for the pixels in the single-color image data sets 34 and compared to the stored data sets, with the comparison conducted for the same set of pixels in both the stored data sets and the single-color image data sets 34. A distribution function can be developed for the particular product based upon replicated datasets, with statistical methodology applied based on the measured standard deviation from the mean. The comparison of the intensity values in the single-color image data sets 34 to the stored data sets can then be assessed based upon the distribution function.

As represented by box 80, an indication of authenticity of the consumer product 21 may then be provided with the portable computing device 12 based upon an outcome of comparing the at least one single-color image data set 34 with the stored data set representative of authentic information for the intrinsic portion 20 (i.e., with authentication decision represented by a "Yes" or "No" from Box 70 in FIG. 2). In embodiments and referring to FIG. 2, an independent indication of authenticity of the consumer product 21 in the database 18 may be registered and considered as an added data point for purposes of determining authenticity, as represented by box 90. The independent indication of authenticity may include, but is not limited to, the preliminary information 40 that is entered by the consumer, as described above, and can also include preconfigured security features that are interrogated through devices other than the portable computing device 12. In embodiments, the indication of authenticity is overt and can be a sound/audible phrase or an indication on the screen of the portable computing device 12 such as, but not limited to, a red light or green light, a displayed phrase relating to the authentic, or an icon. In other embodiments, the indication of authenticity can include a back-end notification of lack of authenticity, such as a notification to the manufacturer or retailer of the existence of a counterfeit product along with information regarding the counterfeit product such as GPS location.

In embodiments, the portable computing device 12 can be calibrated prior to detecting the filtered light 27 from the intrinsic portion 20 of the consumer product 21. Calibration/normalization techniques may be employed to maximize accuracy of authentication in accordance with the methods described herein. Consistent authentication may require control of illumination and detection parameters in order to optimize image quality, optimize repeatability (e.g., two different devices operate similarly), and allow for similar processing of images captured under different conditions. Variances in illumination/imaging may affect the intended results. For example, the photodetector may be subject to operation under many forms of illumination including direct sunlight, cloudy day scattering, fluorescent light, incandescent light, white light LED, etc. Each of those conditions may have a color temperature associated with it, but it also may not be uniform across the 400-700 nm spectral region. In embodiments, a white area with a known normal sunlight CIE coordinate may be employed to calibrate for the different illumination conditions. Any type of light other than direct sunlight would show a deviation from the normal sunlight CIE coordinate and can be mathematically manipulated back to the normal sunlight case. That manipulation can be added into the remainder of the color field so that correction creates more uniform actionable data. Further, in embodiments, calibration methods may be employed to normalize images to one another and between devices so they can be processed similarly.

In another embodiment of an exemplary method, an imaging template does not already exist in the database 18 for an intrinsic portion 20 of the consumer product 21 at issue. In this embodiment, the consumer product 21 is provided as described above in the context of FIGS. 1 and 2 and filtered light 27 is detected in the absence of an image template. The intrinsic portion 20 of the consumer product 21 may be identified within the at least one single-color image data set 34 using the microprocessor 14 of the portable computing device 12, e.g., based upon whether sufficient spectral data is present in the at least one single-color image data set 34. Conventional object matching functionality may be employed to identify the consumer product 21 based upon geometry/configuration, or preliminary information 40 may be provided by the consumer as described above. Authentication may then proceed as described in detail above.

Figure 3:
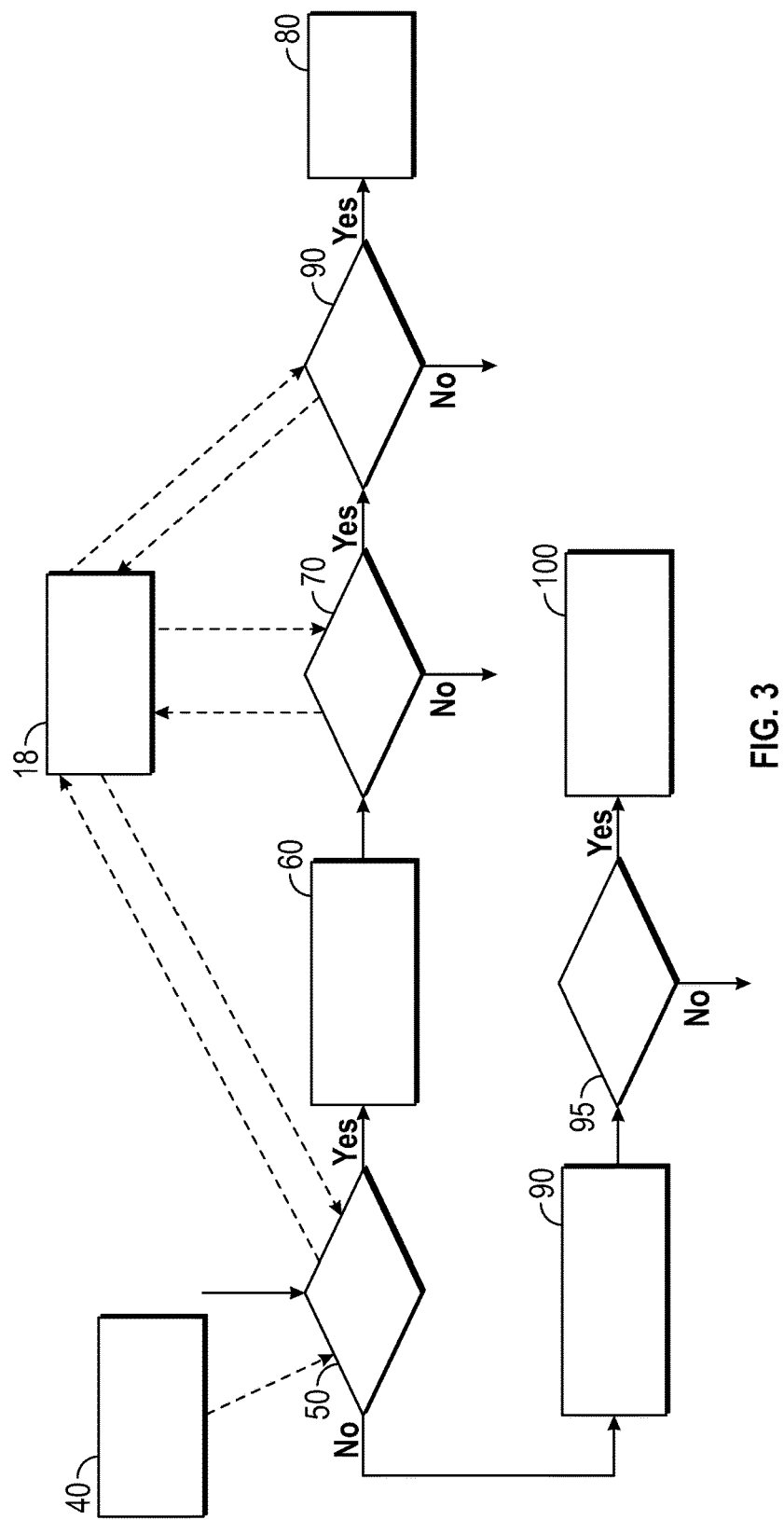
FIG. 3 is a schematic flow diagram of a method for authenticating a consumer product using the system as illustrated in FIG. 1 in accordance with another embodiment.

In another embodiment and with reference to FIG. 3 and continued reference to FIG. 1, the database 18 can be updated based upon information gathered by consumers or other parties. In this embodiment, for certain consumer products, the database 18 is not pre-populated with authentic data and the imaging template does not already exist. The consumer may create new records in the database 18 for the consumer product 21 for later use in authentication. In this embodiment, for consumer products with authentic data already in the database 18, the method can proceed in the same manner as described with regard to FIGS. 1 and 2. For consumer products without authentic data already in the database 18, and possibly without an imaging template for the intrinsic portion 20, the database 18 can collect single-color image data sets 34 and imaging templates may be generated as described above. More specifically, upon determining that an imaging template does not exist based upon entry of preliminary information 40 by the consumer, filtered light 27 is detected from the consumer product 21 or packaging material associated with the consumer product 21 to produce at least one single-color image data set 34, as represented by Box 90. The intrinsic portion 20 of the consumer product 21 may be identified within the at least one single-color image data set 34 using the microprocessor 14 of the portable computing device 12, e.g., based upon whether sufficient spectral data is present in the at least one single-color image data set 34, as represented by Box 95. Geometries of the consumer product 21 within the single-color image data sets 34 may also be mapped for purposes of generating the imaging template, with the intrinsic portion 20 designated based upon features available in the at least one single-color image data set 34. The database 18 may be populated with the single-color image data sets 34 as authentic information for the associated intrinsic portion 20, as represented by Box 100. Additionally, the imaging template may also be populated into the database 18 for future use. In embodiments, the consumer can be provided with remuneration for populating the database 18 with new information. For example, the consumer may be given a discount code for the consumer product 21 being interrogated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method for authentication of a consumer product, wherein the method comprises:

providing the consumer product, optionally with packaging material associated therewith;

detecting filtered light from an intrinsic portion of the consumer product or packaging material associated therewith using a photodetector of a portable computing device to produce at least one single-color image data set representative of the intrinsic portion for at least one color;

comparing the at least one single-color image data set with a stored data set representative of authentic information for the intrinsic portion using a microprocessor of the portable computing device, wherein comparing the at least one single-color image data set with the stored data set is conducted independent of and separate from any analysis of non-color data obtained from preconfigured security features; and providing an indication of authenticity of the consumer product with the portable computing device based upon an outcome of comparing the at least one single-color image data set with the stored data set representative of authentic information for the intrinsic portion.

2. The method of claim 1, wherein detecting the filtered light comprises detecting the filtered light to produce a plurality of single-color image data sets representative of the intrinsic portion for a plurality of respective colors.

3. The method of claim 2, wherein comparing the at least one single-color image data set comprises comparing the plurality of single-color image data sets with stored data sets for the respective single colors, wherein the stored data sets are representative of authentic information for the intrinsic portion.

4. The method of claim 1, wherein detecting the filtered light comprises detecting the filtered light from the intrinsic portion, wherein the intrinsic portion is a free from a preconfigured security feature.

5. The method of claim 1, wherein detecting the filtered light comprises detecting the filtered light from the intrinsic portion, wherein the intrinsic portion emits spectral content in the visible wavelength spectrum in an area of at least 5% based upon a total area of the intrinsic portion in a viewing area of the photodetector.

6. The method of claim 1, further comprising identifying the intrinsic portion of the consumer product within a viewing area of the photodetector using the microprocessor of the portable computing device.

7. The method of claim 6, further comprising retrieving imaging template data for the intrinsic portion from a database based upon preliminary information for the consumer product using the portable computing device, wherein the database is maintained in a non-transitive storage medium and is populated with authentic information for the intrinsic portion.

8. The method of claim 7, further comprising generating an imaging template on a screen of the portable computing device, wherein the imaging template is based on the imaging template data obtained from the database and wherein the imaging template overlies the viewing area of the photodetector as displayed on the screen of the portable computing device.

9. The method of claim 8, further comprising determining a match between the imaging template and corresponding geometry of the intrinsic portion in the viewing area of the photodetector.

10. The method of claim 9, wherein detecting the filtered light from the intrinsic portion further comprises producing the least one single-color image data set after determining the match between the imaging template and the corresponding geometry of the intrinsic portion.

11. The method of claim 1, further comprising populating a database maintained in a non-transitive storage medium with authentic information for the intrinsic portion to produce the stored data set, and wherein comparing the at least one single-color image data set with the stored data set comprises accessing the database in the non-transitive storage medium using the microprocessor.

12. The method of claim 11, wherein populating the database comprises populating the database with the authentic information for the intrinsic portion using the microprocessor after identifying the intrinsic portion of the consumer product and in the absence of pre-identification of the intrinsic portion.

13. The method of claim 11, further comprising registering an independent indication of authenticity of the consumer product in the database using the portable computing device.

14. The method of claim 1, wherein providing the indication of authenticity of the consumer product further comprises providing the indication of authenticity of the consumer product based upon the outcome of comparing the at least one single-color image data set with the stored data set representative of authentic information and further based upon an independent indication of authenticity of the consumer product as registered using the portable computing device.

15. The method of claim 1, wherein providing the consumer product comprises providing the consumer product with the intrinsic portion comprising a demarcating element for identifying the intrinsic portion to be considered for comparison to the authentic information.

16. The method of claim 1, further comprising calibrating the portable computing device prior to detecting the filtered light from the intrinsic portion of the consumer product.

17. A method of authentication of a consumer product, wherein the method comprises:
   providing the consumer product, optionally with packaging material associated therewith;
   detecting filtered light from an intrinsic portion of the consumer product or packaging material associated therewith using a photodetector of a portable computing device to produce at least one single-color image data set representative of the intrinsic portion for at least one color;
   registering an independent indication of authenticity of the consumer product in a database using the portable computing device; and
   populating the database with the at least one single-color image data set after registering the independent indication of authenticity.

18. The method of claim 17, wherein detecting the filtered light comprises detecting the filtered light with a consumer using the photodetector of the portable computing device.

19. A system for authentication of a consumer product, wherein the system comprises:
   a portable computing device including a microprocessor and a photodetector, wherein the photodetector is configured to produce single-color image data sets representative of an intrinsic portion of the consumer product or packaging material associated therewith;
   a database in electronic communication with the microprocessor, wherein the database is populated with single-color image data sets representative of authentic information for the intrinsic portion.

\* \* \* \* \*